(12) United States Patent
Giannelli (10) Patent No.: US 6,253,664 B1
(45) Date of Patent: Jul. 3, 2001

(54) BREWING UNIT FOR AUTOMATIC BEVERAGE DISPENSERS

(75) Inventor: Giuseppe Giannelli, Olgiate (IT)

(73) Assignee: Moulinex S.A., Caen Cedex (FR)

( * ) Notice: Subject to any disclaimer, the term of this patent is extended or adjusted under 35 U.S.C. 154(b) by 0 days.

(21) Appl. No.: 09/486,988

(22) PCT Filed: Sep. 4, 1998

(86) PCT No.: PCT/FR98/01906

§ 371 Date: Jun. 12, 2000

§ 102(e) Date: Jun. 12, 2000

(87) PCT Pub. No.: WO99/12457

PCT Pub. Date: Mar. 18, 1999

(30) Foreign Application Priority Data

Sep. 5, 1997 (IT) .............................. CO970015 U
Mar. 20, 1998 (IT) .............................. CO980005 U (51) Int. Cl.⁷ .................................................... A47J 31/40
(52) U.S. Cl. .......................... 99/302 P; 99/287; 99/289 P
(58) Field of Search .................................. 99/302 P, 287, 99/289 R, 280, 297

(56) References Cited

U.S. PATENT DOCUMENTS

| 4,852,472 | * | 8/1989 | In-Albon et al. | 99/302 P X |
| 5,431,088 | * | 7/1995 | Cia et al. | 99/302 P X |
| 5,479,849 |   | 1/1996 | King et al. | 99/237 |

FOREIGN PATENT DOCUMENTS

| 20 12 503 | 10/1970 | (DE) . |
| 42 03 088 | 10/1992 | (DE) . |
| 0 270 141 | 6/1988  | (EP) . |

* cited by examiner

Primary Examiner—Reginald L. Alexander
(74) Attorney, Agent, or Firm—Young & Thompson

(57) ABSTRACT

A brewing unit comprises a body containing a brewing chamber with vertical axis capable of receiving a pressing plunger mounted mobile along the vertical axis, and a hydraulic jack whereof the piston rod is connected to the pressing plunger and can pass from an inoperative position to a working position, by the effect of a liquid under pressure. The hydraulic jack is a single-acting actuator, the piston rod being returned in inoperative position by compressible and extensible elements. The invention is applicable to espresso coffee brewing machines.

9 Claims, 13 Drawing Sheets

BREWING UNIT FOR AUTOMATIC BEVERAGE DISPENSERS

CROSS REFERENCE TO RELATED APPLICATION

This is the 35 USC 371 national stage of international application PCT/FR98/01906 filed on Sep. 4, 1998, which designated the United States of America.

FIELD OF THE INVENTION

The present invention relates to an infusion assembly for automatically dispensing beverages made from powdered coffee or the like and comprising a body enclosing an infusion chamber with a vertical axis having a bottom and an outlet, comprising a filter plate movably mounted in said chamber by means of an ejection mechanism, and adapted to receive a presser piston mounted movably along said vertical axis, as well as a hydraulic jack whose piston is connected to said presser piston and can pass from a rest position to a working position, under the influence of a liquid under pressure; the presser piston being in compression in the chamber in the working position.

BACKGROUND OF THE INVENTION

In automatic beverage dispensers, there already exist different types with various infusion assemblies. These assemblies have complicated mechanical movements performed by electric motors and reducers, of high cost, as well as lever transmissions which must be very precise. These assemblies also require a very precise volumetric dosage of the coffee powder so as to avoid interfering with the movements and transmissions. It will be understood that the operation of such assemblies is delicate and require careful production and assembly of multiple mechanical pieces.

To overcome these delicate and difficult constructions, it has already been proposed to replace these motorized movements and lever transmissions with movements performed by double-acting hydraulic jacks. Unfortunately, this type of hydraulic jack is difficult to control, not only as to the movement of its piston, but also as to the equilibrium of the opposing pressures, and gives rise to prohibitive costs for automatic beverage dispensers, such as espresso coffee-making machines which must be mass-produced.

SUMMARY OF THE INVENTION

The object of the present invention is to simplify the mechanisms and hence to render them more reliable and less costly on an industrial scale, whilst providing flexible and practical operation to guarantee the maximum results in the preparation of the infusion.

These objects are achieved by providing a single-acting hydraulic jack, the piston being returned to its rest position by compressible and extensible means.

Thus, the piston ensures, in a first step, the descent and compression of the presser piston into the infusion chamber under the force of the liquid under pressure, and in a second step the rising and automatic withdrawal of said presser piston from the chamber under the influence of the compressible and extensible means. Moreover, to produce real espresso coffee, it is necessary to ensure certain essential parameters which are the temperature of the water and the compaction of the coffee powder within the infusion chamber. This compaction, depending either on the degree of grinding of the ground coffee, or its hygrometry, can be guaranteed by this single-acting jack which adjusts automatically to the mass of ground coffee during its compression, and which is returned automatically by the compressible and extensible means at the end of an infusion cycle. Thus, said jack and the presser piston operate without an end of path microswitch at either end of the path and cannot become blocked in an intermediate position because there is no supplemental linkage with adjusted movement.

In a first embodiment, the compressible and extensible means is a coil spring and the single-acting jack has corresponding structure.

In a second embodiment, the compressible and extensible means is a gas and the single-acting jack has a slightly different structure from that of the spring jack.

According to a preferred characteristic of the invention, the body of the infusion assembly is arranged laterally of the cylinder and the upper rod of the hydraulic jack carries the arm forming a beam whose free end is connected to the presser piston, the paths of the pistons thus extending in practically parallel directions.

Thanks to such an arrangement, there is obtained a compact height of the assembly and a reliable operation despite the drawbacks or precision inherent in fabrication of pieces of mass production. Moreover, the space saving is connected directly to the reduction in sales price of the automatic beverage dispensing machine.

According to another characteristic of the invention, there is provided a means to dry the cakes of coffee grounds at the end of the infusion cycle, and for this, the presser piston comprises an internal conduit for passage of the infusion which has three openings, a first inlet opening for the infusion opening into the lower surface of the piston, a second outlet opening forming a small fountain for the outlet of the infusion and a third opening forming an air intake and arranged in the upper portion of the piston, said presser piston being mounted moreover movably axially on the pivot and said third opening comprising a joint adapted to close this opening when the piston comes into contact with the lower portion of the arm.

According to still another aspect of the invention, there is provided an ejection mechanism for the cake of grounds formed in the infusion chamber and which comprises, on the one hand, a rod secured to the filter plate, mounted along a vertical axis, sliding in the body and having at its external end a small plate, said filter plate being returned resiliently downwardly of the infusion chamber by a spring arranged between the body and the small plate, and, on the other hand, an arm transversely connected to the lower rod of the jack, movably mounted rotatably on said rod, and which one end comes into engagement with a track of a cam carried by a wing extending in a vertical plane below the jack, whilst the other end is adapted either to come into engagement with the small plate when the piston head passes from its lower position to its upper position, or to escape from this plate when the head passes from its upper position to its lower position.

According to still another important characteristic of the invention, the infusion assembly comprises an expulsion device for the grounds comprising a guide console projecting upwardly, secured to the jack and having a lever pivotably mounted about an axis transverse to the vertical axis and carrying at its free end a scraper adapted to be moved transversely for pendular sweeping in the outlet region by means of a finger secured to the arm which comes into engagement with a notch on the lever at the level of the axis, when the piston head occupies its rest position.

This device is of extremely simple construction, requiring only a single movable member thus not requiring any precise adjustment after production and hence increasing the reliability of operation and concomitantly reducing the cost of production.

BRIEF DESCRIPTION OF THE DRAWINGS

The characteristics and advantages of the invention will become apparent from the description which follows, given by way of non-limiting example, with reference to the accompanying drawings, in which.

DETAILED DESCRIPTION OF THE INVENTION

The infusion assembly shown particularly in FIGS. 1 to 4 is adapted to equip a coffee machine of the automatic type comprising a cold water supply, a powdered coffee dispenser from either a store of powdered coffee, or a coffee grinder integrated in the dispenser, a heater to heat the cold water, an electric circulation pump for water connected to the cold water supply and to the heater to prepare the infusion and to operate a hydraulic jack, as well as an electronic command and control device for the cycles of preparing infusions.

Figure 15:
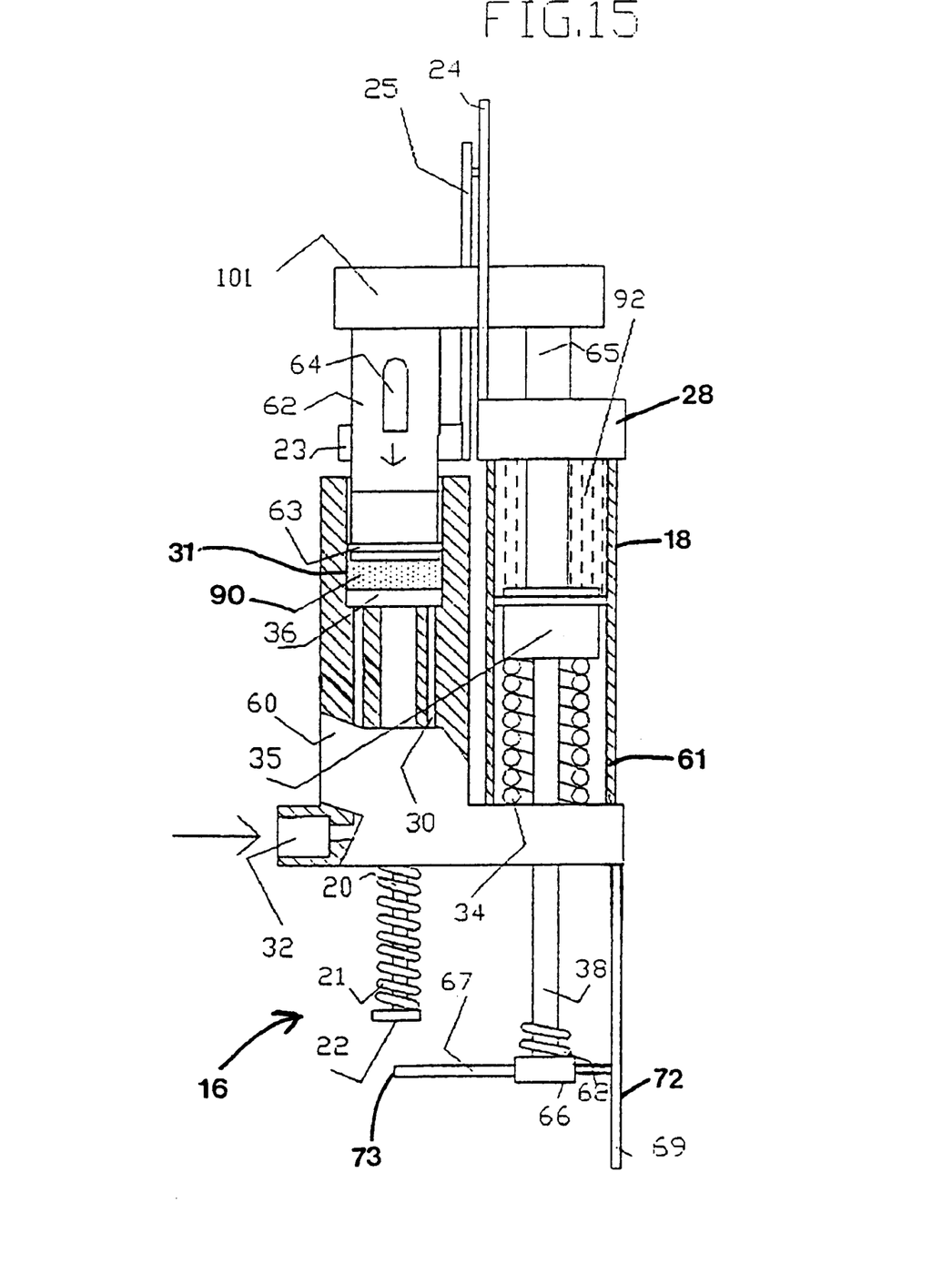
Figure 16:
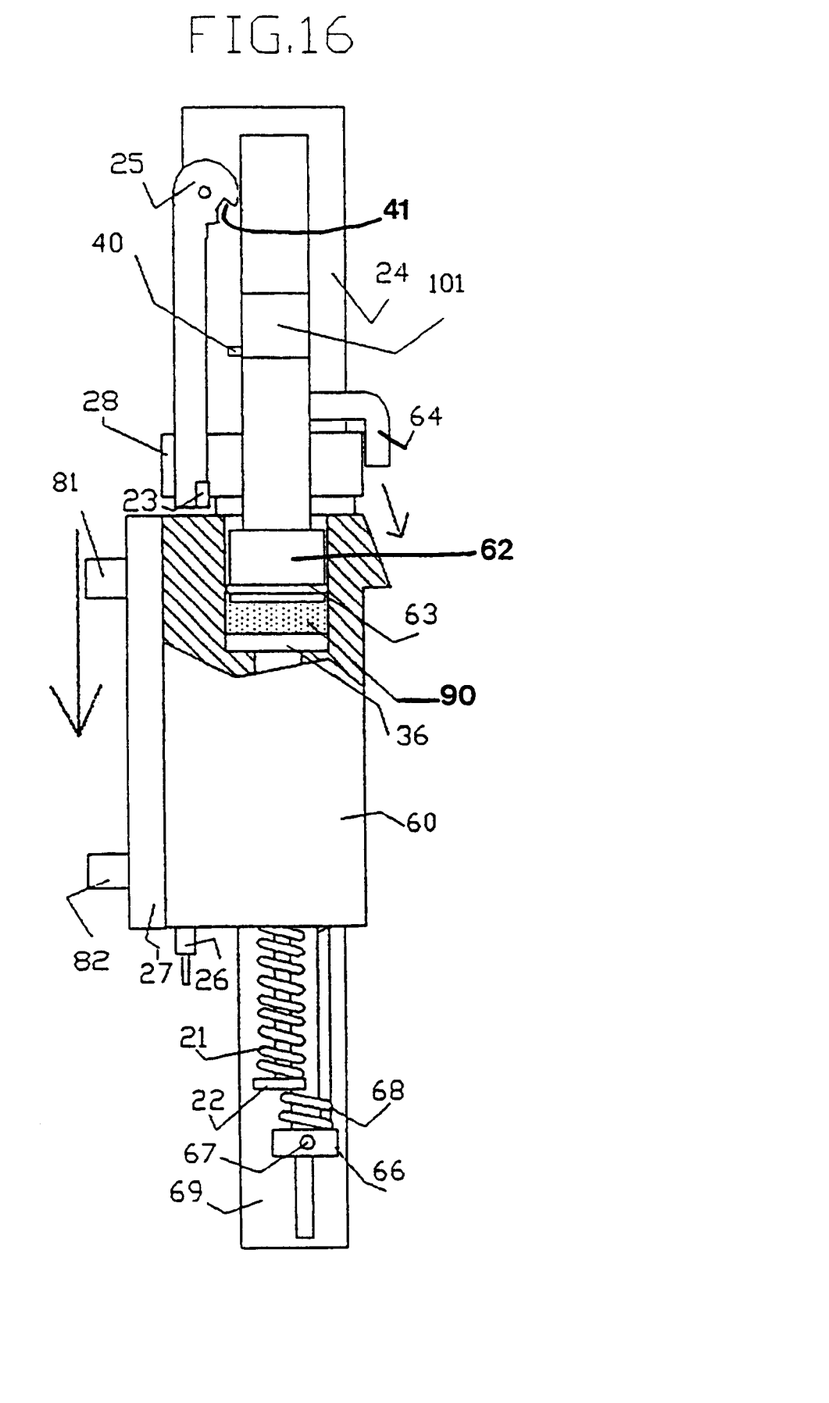

This infusion assembly comprises a body 10 enclosing an infusion chamber 31 with a vertical axis V having a bottom 11 and an outlet 15, comprising a filter plate 36 movably mounted in said chamber by means of an ejection mechanism 16, and adapted to receive a presser piston 62 mounted movably along the vertical axis V, as well as a hydraulic jack 61 whose piston 35 is connected to said presser piston and can pass, under the influence of a liquid under pressure such as the water propelled by the electric pump, from a rest position to a working position, in which working position the presser piston 62 is in compression in the infusion chamber 31 (see FIGS. 15 and 16).

Figure 1:
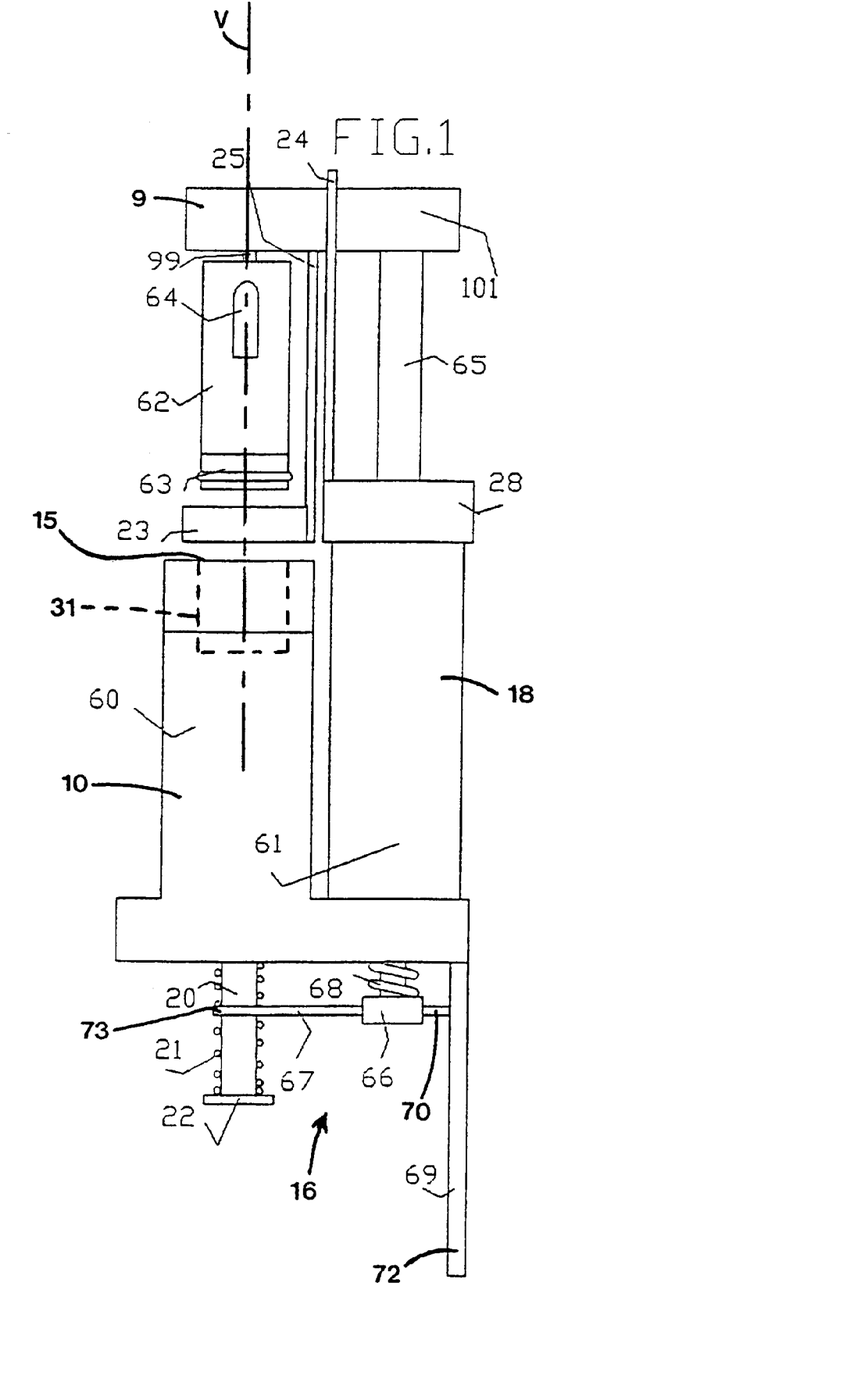
FIG. 1 is a front elevational view of an infusion assembly according to the invention.
Figure 2:
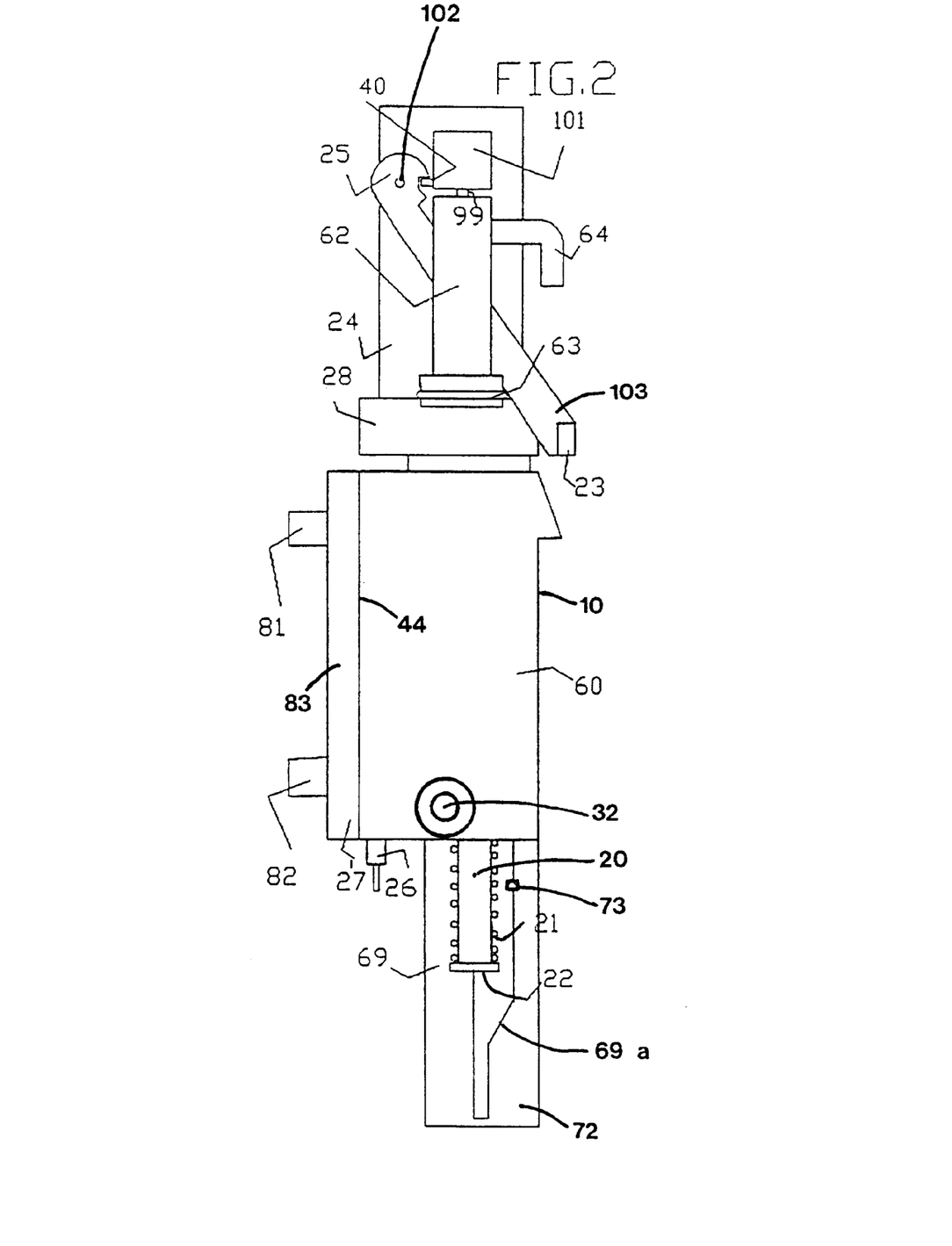
FIG. 2 is a left side view of the infusion assembly of FIG. 1.
Figure 3:
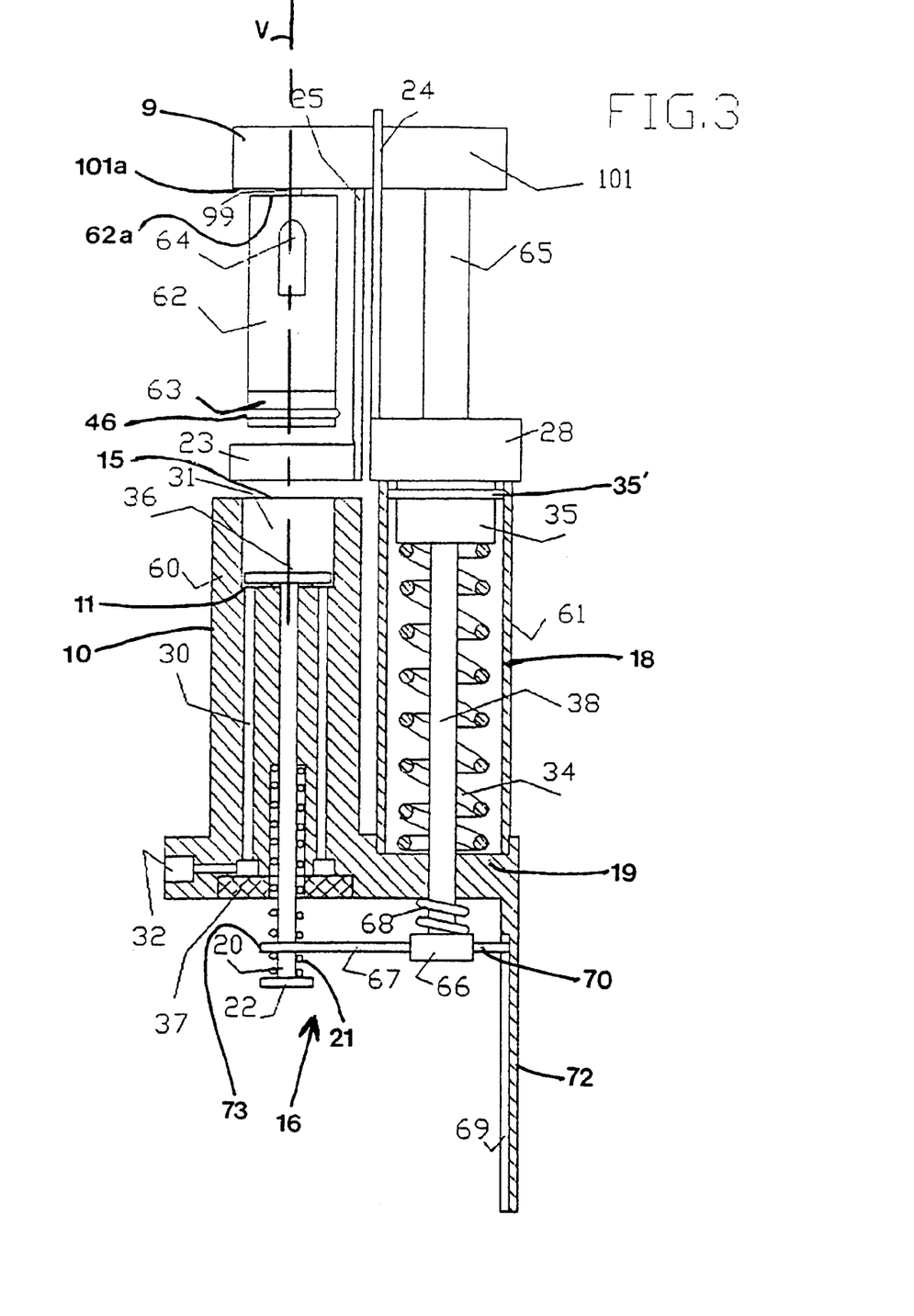
FIG. 3 is a fragmentary vertical cross-sectional view of the assembly according to FIG. 1, showing an infusion chamber, a hydraulic jack, and an ejection mechanism.
Figure 4:
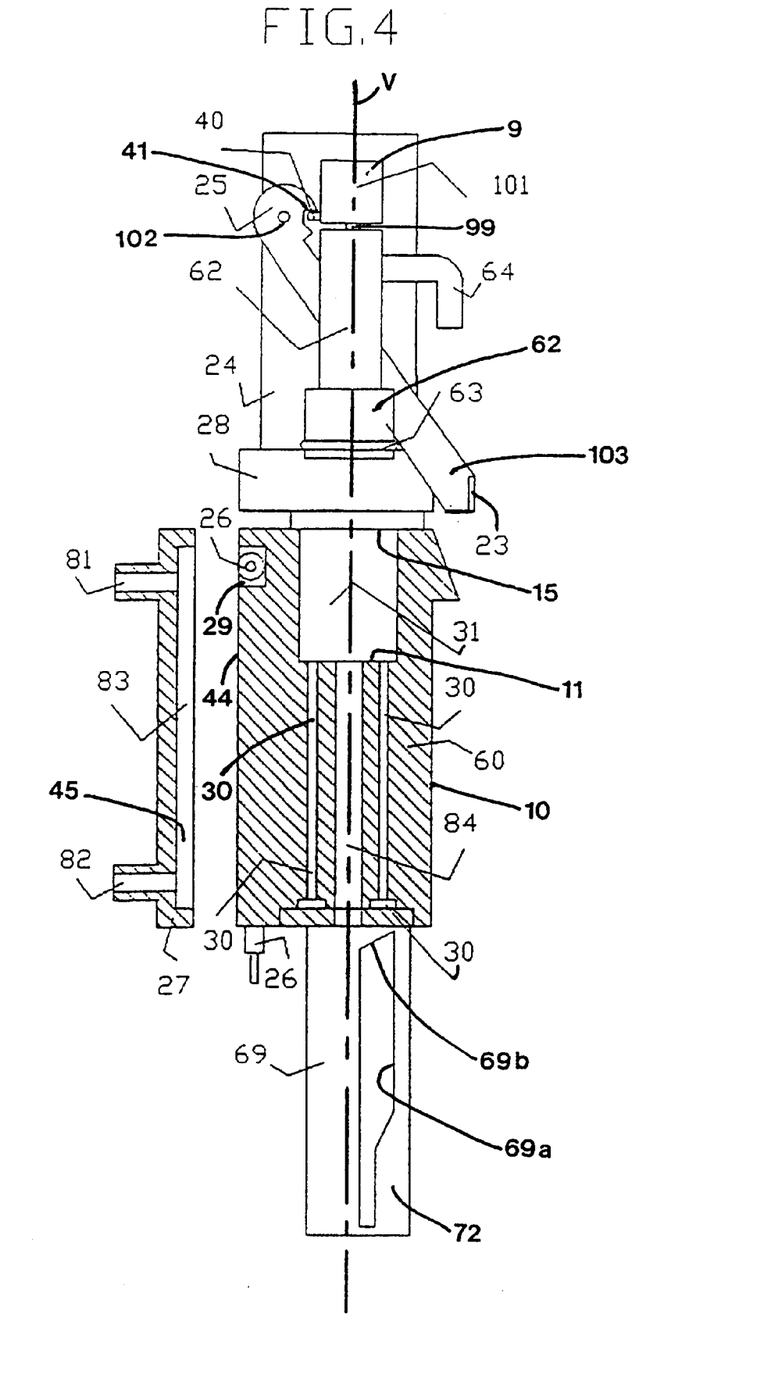
FIG. 4 is a fragmentary vertical cross-sectional view of the assembly of FIG. 2 with an instantaneous heater shown exploded and without the ejection mechanism.

As is seen particularly in FIGS. 3 and 4, the heater 60 of the instantaneous type is formed from a single piece with the body 10 enclosing the infusion chamber 31 and comprises an electric heating resistance 36 inserted in the body 10. This resistance is of the shielded type for example and is shaped as a pin of U-shape which is inserted in a groove 29 of the sidewall of the body 10 and which extends over practically all the height of this body so as to heat integrally the infusion chamber 31 and the channels 30 that are rectilinear and parallel to the axis V and serve as passages for the cold water which enters these channels by an inlet 32 arranged at the base of the body 10.

In order to impart to this type of coffeemaking machine described above a "steam outlet" function, the infusion assembly according to the invention also comprises a secondary heater 83 secured to the sidewall 44 of the body 10 and providing a flattened chamber 45 heated by the resistance 26 and having a water inlet 81 and a steam outlet 82.

According to the invention, the hydraulic jack 61 is a single-acting jack, the piston 35 being returned to its rest position by a compressible and extensible means. According to a first characteristic of the invention, said compressible and extensible means is a coil compression spring 34. This spring is either of the cylindrical type with non-touching turns, or of the conical type with non-touching turns permitting a greater axial compression and hence a saving of height of the jack.

Figure 19:
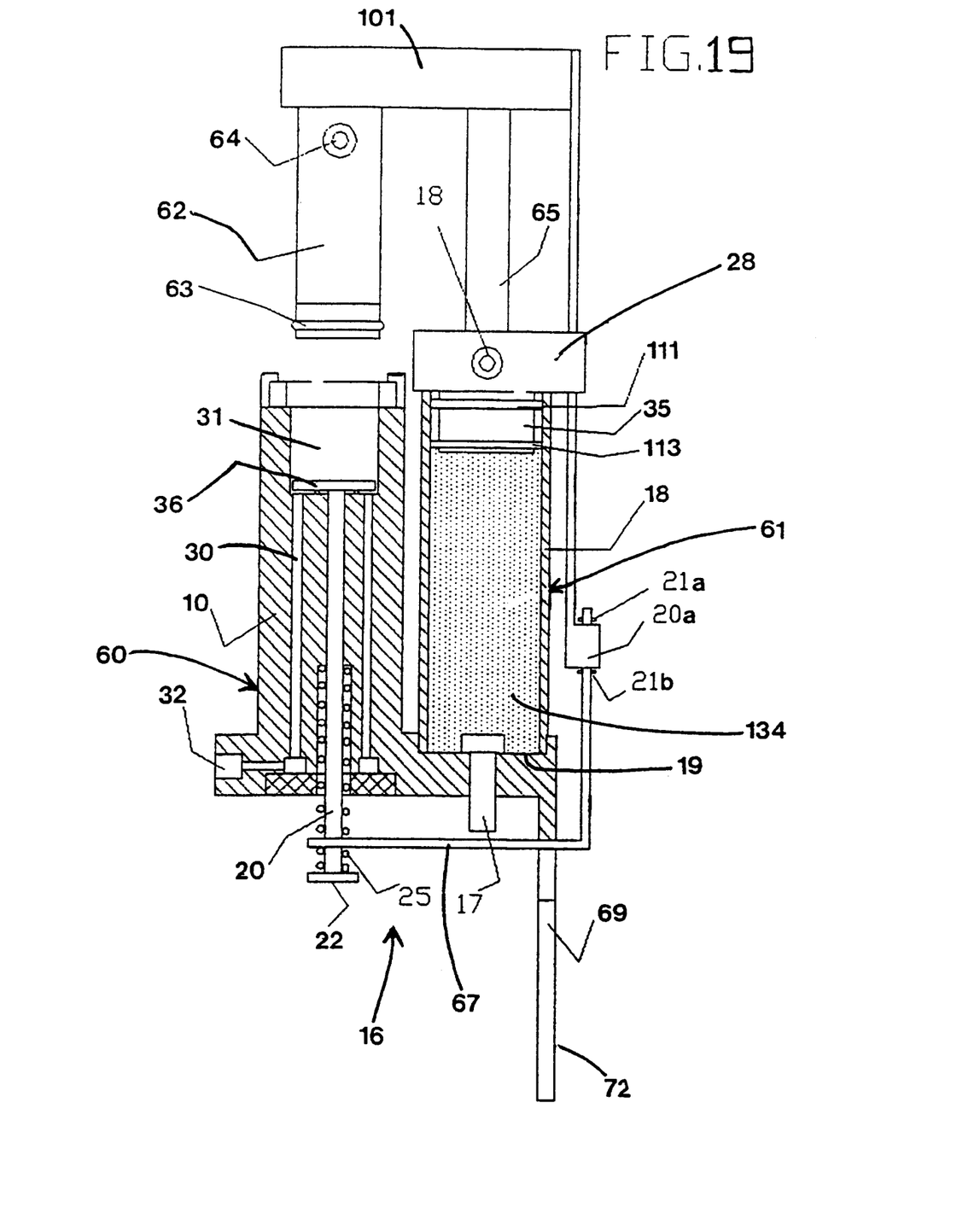
FIG. 19 is a modified embodiment of the infusion assembly and shows in fragmentary cross-section a new hydraulic jack according to the invention.

According to a modified embodiment of the invention shown in FIG. 19, the compressible and extensible means is a gas 34. This gas is preferably a neutral gas. This gas is introduced for example through a loading valve 17 arranged in the bottom 19 of the jack 61.

Figure 10:
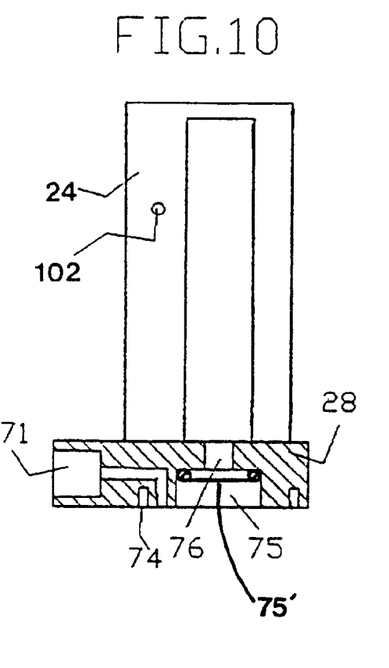
FIG. 10 is a fragmentary cross-sectional view of a plug of the hydraulic jack shown particularly in FIG. 3.
Figure 11:
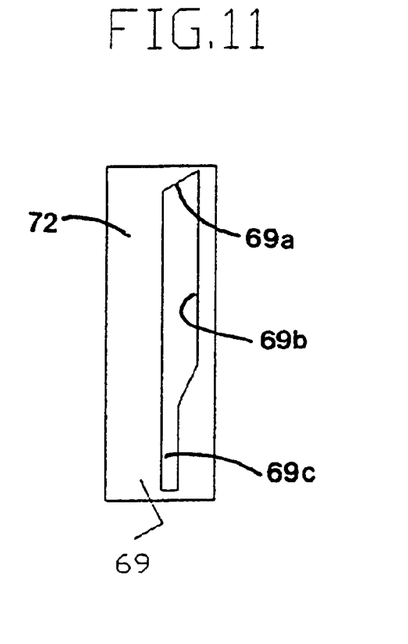
FIG. 11 is a plan view of a detail of the ejection mechanism shown particularly in FIGS. 3 and 4.
Figure 12:
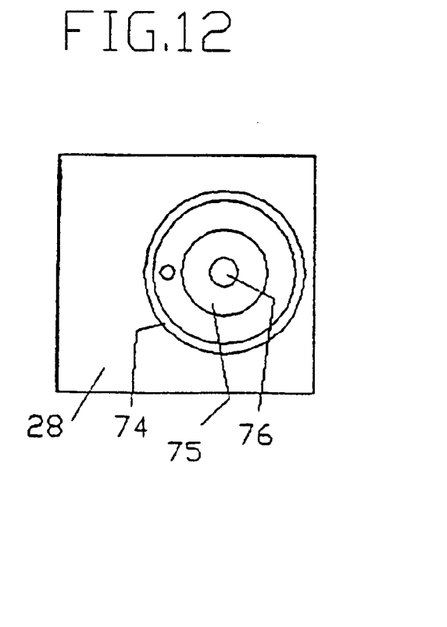
FIG. 12 is a bottom view of FIG. 10, with a joint eliminated.

In the first embodiment shown in FIGS. 1 to 18, the hydraulic jack comprises a cylinder 18 closed at its ends by an upper plug 28 and a bottom 19 and through which slide respectively an upper rod 65 connected by an arm 101 to the presser piston 62 and a lower rod 68 connected to the ejection mechanism 16, said rods 65 and 38 being secured to the head of the piston 35 slidably mounted in the cylinder 18 and movable between a high position in which the head 35 is pressed by the pressure of the liquid from the pump (7 to 10 bars) and introduced by an inlet-outlet conduit 71 (FIG. 10) provided in the plug 28 and supplied by a three-way electrovalve (not shown), and a low position in which the head 35 is pressed toward the upper position by the spring 34 arranged below the head 35.

To ensure good sealing of the jack, the plug 28 has (FIGS. 10 and 12) a seat 74 which receives the force of the edge of the cylinder 18, as well as a seat 75 for a sealing joint 75' for the rod 65 which passes through a bore 76 5 provided in said plug. On the other hand, the piston head 35 carries a sealing means 35'.

In the modified embodiment shown in FIG. 19, in which the same reference numerals are used for similar parts, the hydraulic jack 61 comprises a cylinder 18 closed at its ends by an upper plug 28 and a bottom 19. The bottom 19 receives the valve 17 for loading gas 134, whilst the plug 28 is traversed by the rod 65. The head 35 of the piston carries a sealing means comprising two peripheral joints 111 and 113.

Thanks to this hybrid hydraulic jack of the single-acting type, there is obtained a simple, reliable and less costly construction. Thus, there are eliminated the problems of controlling the piston by a supplemental electrovalve as well as path detectors associated with the head and the electric pump is provided because the spring or the gas alone maintains said head in the upper position without exerting abnormal pressure on the plug 28.

According to another preferred characteristic of the invention, the body 10 of the infusion assembly is arranged laterally of the cylinder 18 and the rod 65 of the hydraulic jack 61 carries the arm 101 forming a beam whose free end 19 is connected to the presser piston 62, the paths of the pistons 35 and 62 thus being arranged in practically parallel directions. Moreover, the presser piston 62 is floatingly mounted on a pivot 99 connected to the arm 101, thereby providing a slight play between the upper portion 62a of the presser piston and the lower portion 101a of the arm (see FIGS. 5 and 6).

Thanks to such a construction, the height-wise size of the infusion assembly is greatly reduced relative to an arrangement with a jack aligned along the vertical axis V of let the infusion chamber. On the other hand, the beam connection between the jack 61 and the presser piston 62 permits the floating mounting of said piston without a complicated mechanism and hence ensures a good coincidence and/or concentricity between the presser piston 62 and the chamber 31 during its introduction and its sliding within said chamber. To facilitate this introduction of the presser piston, the edge of the outlet 15 can be slightly hollowed. Another advantage of this beam construction is the distribution of the forces between the jack 61 and the presser piston 62 during incorrect loading of the ground coffee into the infusion chamber 61, which distribution of forces arises from the assembly of rod 65, arm 101 and pivot 99.

Figure 5:
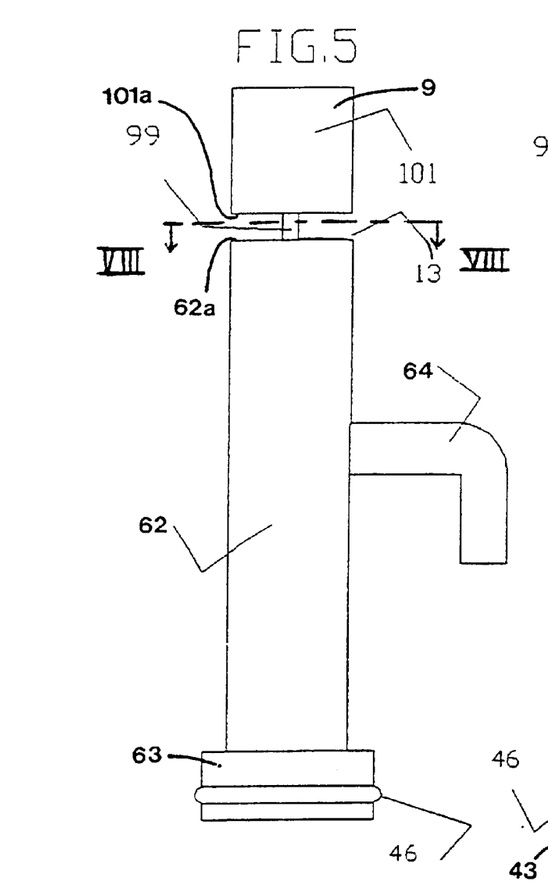
FIG. 5 is an elevational view on an enlarged scale of a presser piston according to the invention.
Figure 6:
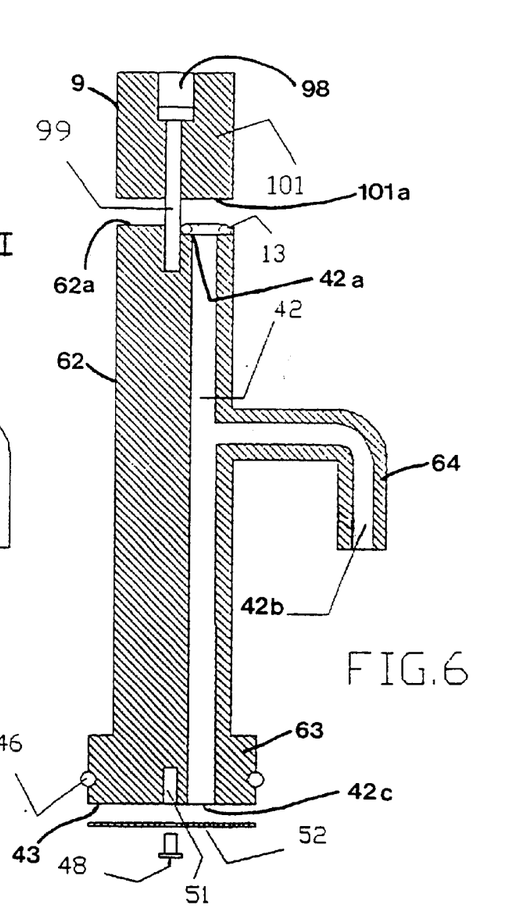
FIG. 6 is a vertical cross-section of the presser piston of FIG. 5.
Figure 7:
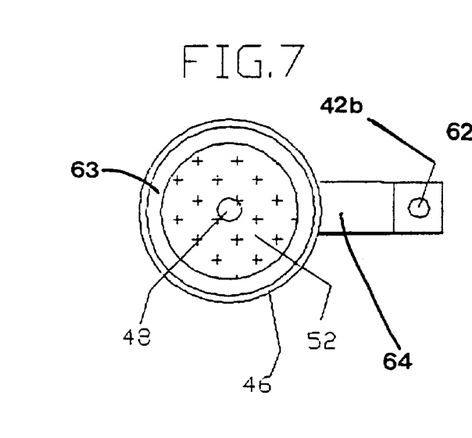
FIG. 7 is a bottom view of the presser piston of FIG. 5.
Figure 8:
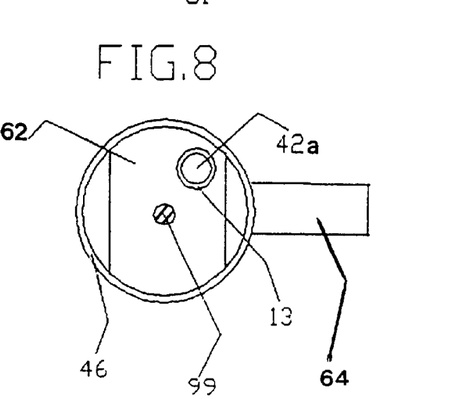
FIG. 8 is a top view on the line 8—8 of FIG. 5.
Figure 9:
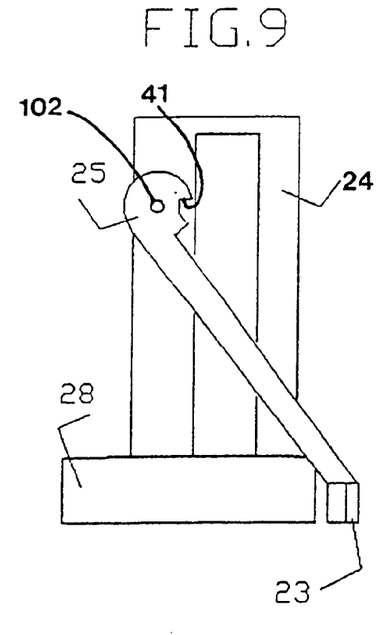
FIG. 9 shows schematically in elevation a device for expelling grounds with a lever, incorporated in the infusion assembly according to the invention.

According to another particular characteristic illustrated in FIGS. 5 and 6, the presser piston 62 comprises an internal conduit 42 for passage of the infusion which has three openings, a first inlet opening for the infusion 42c opening in the lower surface 43 of the presser piston, a second outlet opening 42b forming a small fountain 64 for outlet of infusion, and a third opening 42a forming an air intake and arranged in the upper portion 62a of the piston. The small fountain 64 is connected directly to a trough (not shown) for filling cups. The presser piston 62 has at its end a head 63 comprising a peripheral sealing joint 46 as well as a filter 52 for the infusion retained on said head by a screw 48 screwed into a hole 51. As will be seen in FIG. 6, the presser piston 62 is moreover movably axially mounted on the pivot 99 thanks to the axial play of securement of this pivot in the hole 98 provided in the arm 101, and said third opening 42a comprises a joint 13 adapted to close this opening when the piston comes into contact with the lower portion 101a of the arm 101 during compression of the presser piston 62 against the ground coffee contained in the chamber 31.

The interest of this mounting of the presser piston axially movable in combination with the third opening 42a, resides in the creation of an external air inlet which, during rising movement of said presser piston from its compression position to its extraction position, creates a vacuum in the chamber 31 and hence a sufficiently great fresh air intake into the conduit 42 to drive the cake of coffee grounds resting on the filter plate 36.

According to still another characteristic of the invention, the ejection mechanism 16 comprises, on the one hand, a rod 20 secured to the filter plate 36, rising along the vertical axis V, sliding in the body 10, and having at its external end a small plate 22, the filter plate 36 being returned resiliently toward the bottom 11 of the infusion chamber 31 by a spring 21 arranged between the body 10 and the small plate 22, and on the other hand, an arm 67 transversely connected to the lower rod 38 of the jack 61, movably mounted in rotation on said rod by means of a holding plate assembly 66 connected to the rod and friction spring 68, and whose one end 70 comes into engagement with a track 69a of a cam 69 (see FIGS. 3 and 11) carried by a wing 72 extending in a vertical plane below the jack 61, whilst the other end 73 is adapted either to come into engagement with the small plate 22 when the piston head 35 passes from its working position to its rest position, or to escape from this plate when the head 35 passes from its rest position to its working position. This cam 69 has a slope 69b for returning to a lateral position of the arm 67 relative to the small plate 22.

This ejection mechanism 16 is of a simple and economical construction because it comprises no adjustment mechanism or adjusted connection, the arm 67 positioning itself below the small plate 22 as a function of the movement of its end 70 in the single cam 69. This ejection mechanism, by its simplicity, guarantees the automatic rising of the filter plate 36 at each end of an infusion cycle and at the right time, which is to say at the end of the path of the head 35 of the hydraulic jack 61 toward its rest position.

In order to improve the ejection of the cake of grounds dried by the air current from the conduit 42, the infusion assembly comprises a device for expelling infusion grounds from the filter plate 36. This device, better seen in FIGS. 2, 4, 9, 14 and 18, comprises a guide console 42 projecting upwardly, secured to the jack 61 and bearing a lever 24 pivotally mounted about an axis 102 transverse to the vertical axis V and carrying at its free end 103 a scraper 23 adapted to be given a transverse pendular sweeping movement in the region of the outlet 15 by means of a finger 40 secured to the arm 101, projecting transversely, and which comes into engagement with a notch 41 carried by the lever 25 at the level of the axis 102 when the piston head 35 comes to occupy its rest position. This expulsion device of the grounds is also of a very simplified construction and acts directly, in eliminating any adjustment after construction. The single lever 25 is directly actuated at the end of the path of the jack and is briskly swung into the expulsion position because of the connected implantation of the notch 41 of the axis 102. It is to be noted that the expulsion device and ejection mechanism shown in FIG. 19 are different in their embodiment from those described above and do not form a portion of this patent application.

Figure 13:
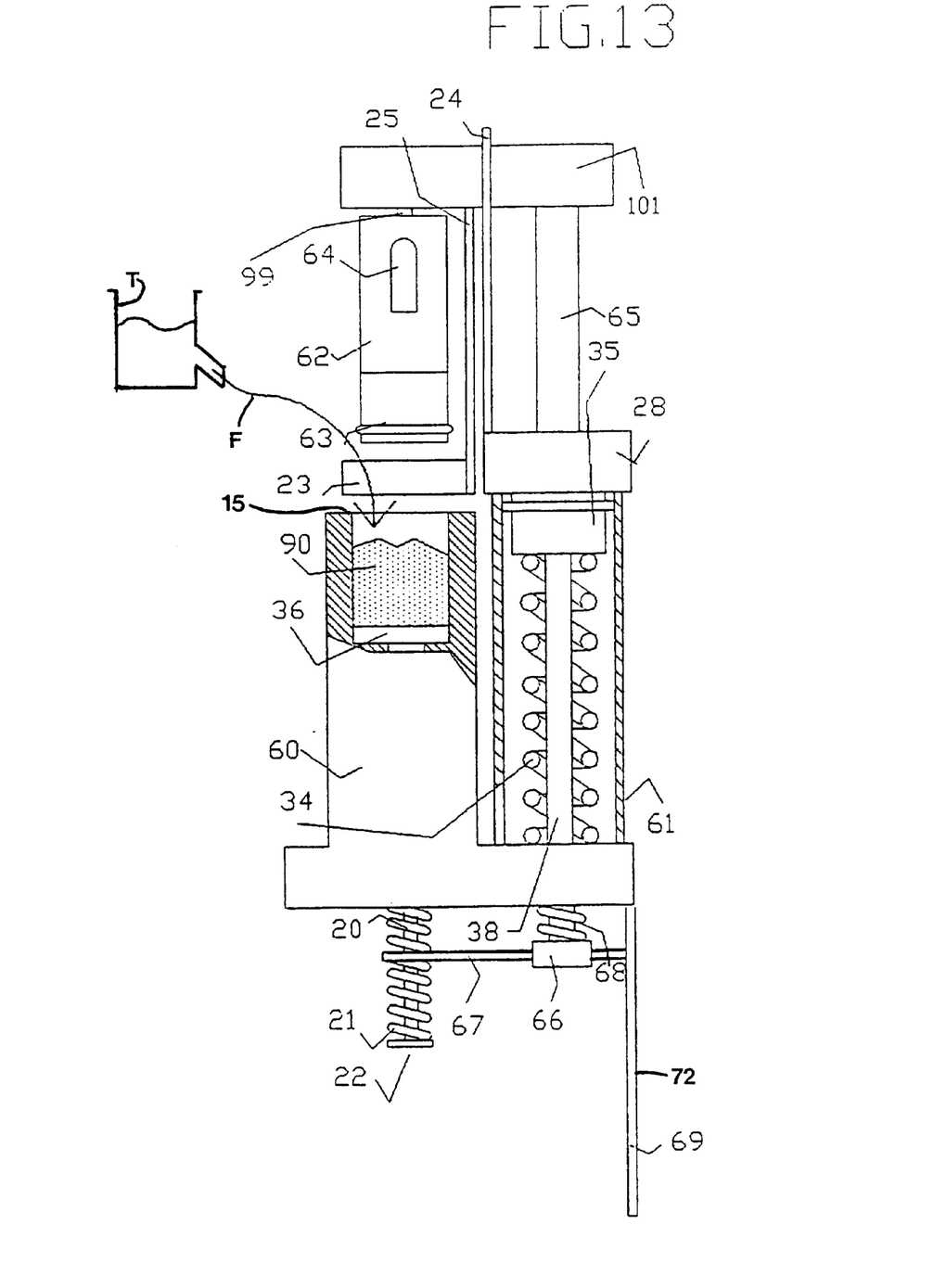
FIGS. 13, 14, 15, 16, 17 and 18 are different views in fragmentary cross-section of the infusion assembly according to the invention showing the various steps of operation during the cycle of preparing an infusion.
Figure 14:
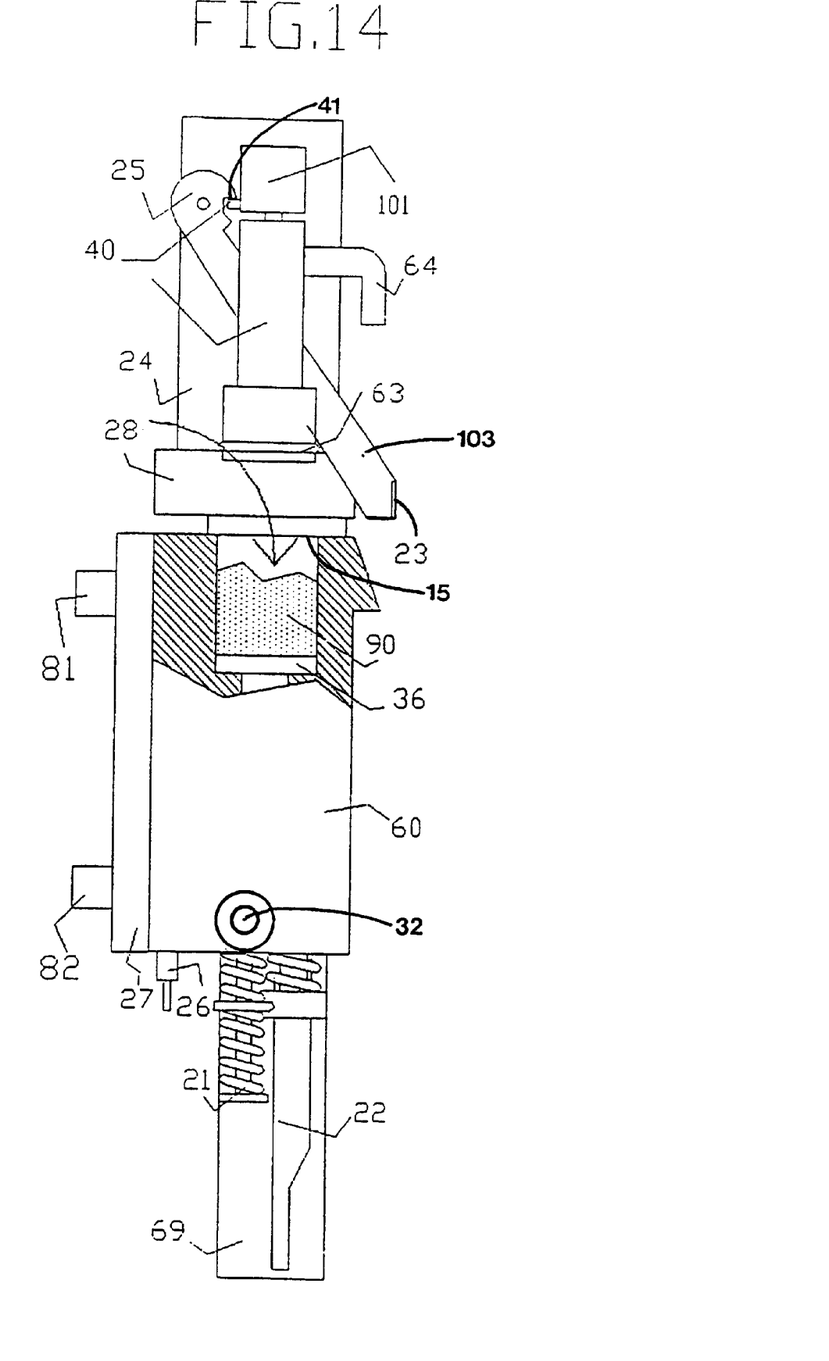

Referring now only to FIGS. 13 to 18, the operation of the infusion assembly will be summarized hereafter for the automatic beverage dispenser from powdered coffee poured (arrow F) from a hopper schematically shown at T (FIG. 13).

In the first phase of an infusion cycle (FIGS. 13 and 14), the single-acting hydraulic jack 61 is in the rest position under the influence of spring 34 and the presser piston 62 is maintained above the infusion chamber 31, thereby permitting filling this chamber with a measured quantity of powdered coffee 90; the scraper 23 being maintained spaced from the outlet 15 of the chamber by means of the finger 40 in engagement with the notch 41, and the ejection mechanism 16 being neutralized because the arm 67 is maintained by the cam 69, namely the upper portion of the slope 69b, beside and above the small plate 22.

In a second phase of said cycle (FIGS. 15, 16), there is introduced by the electric pump liquid under pressure 92 into the chamber 18 above the head 35 of the piston to bring it into engagement with the spring 34 in its working position, in which position the spring is totally compressed and thereby determines the corresponding path of the presser piston 62 and hence the compression, of the powdered coffee 90 in the chamber 31. During this compression, the arm 101 has closed the air inlet opening 42a and the arm 67 of the ejection mechanism is positioned by the cam 69, namely the narrow guide 69c, in alignment with and below a small plate 22. By means of the single electropump and by the three-way electrovalve, cold water is introduced through the inlet 32 which is instantaneously heated in the channels 30 forming a heat exchanger, and which passes through the powder 90 during a predetermined pressure time, then the infusion thus made passes through the conduit 42 to flow through the fountain 64, via a flexible tube (not shown), toward the distribution means into coffee cups positioned on a base of the coffee-making machine. It will be noted that in this phase, the lever 25 (FIG. 16) and the scraper 23 are in the ready position, the finger 40 extending toward the bottom of the notch 41.

In the third phase, the so-called end of the infusion cycle (FIGS. 16 and 17), the three-way electrovalve controlled by the electronic control device cuts the supply of cold water of the heater 60 and permits escape of the liquid from the jack 61 which is done by means of the spring 34 which automatically extends and pushes the head 35 to its rest position.

Figure 17:
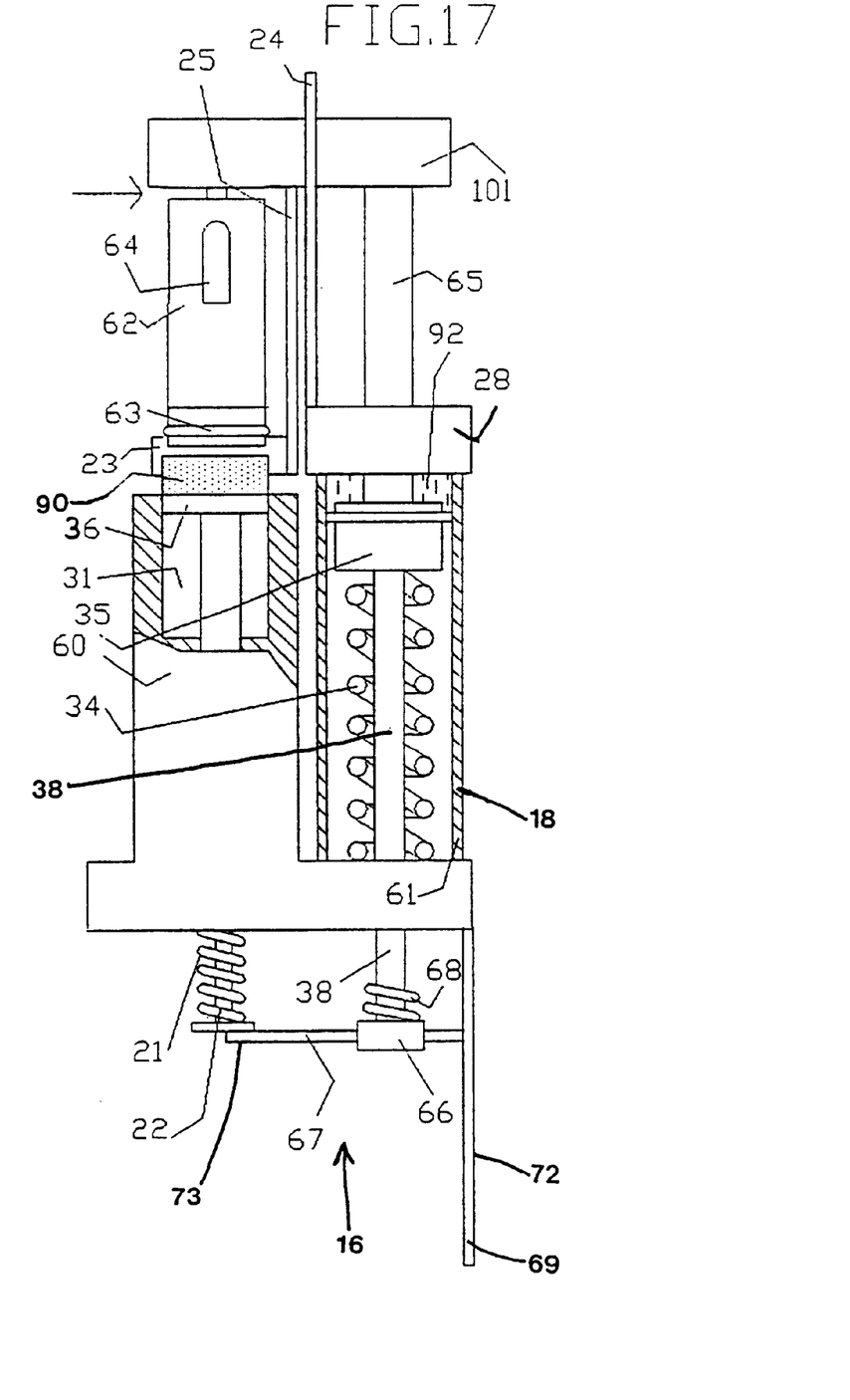
Figure 18:
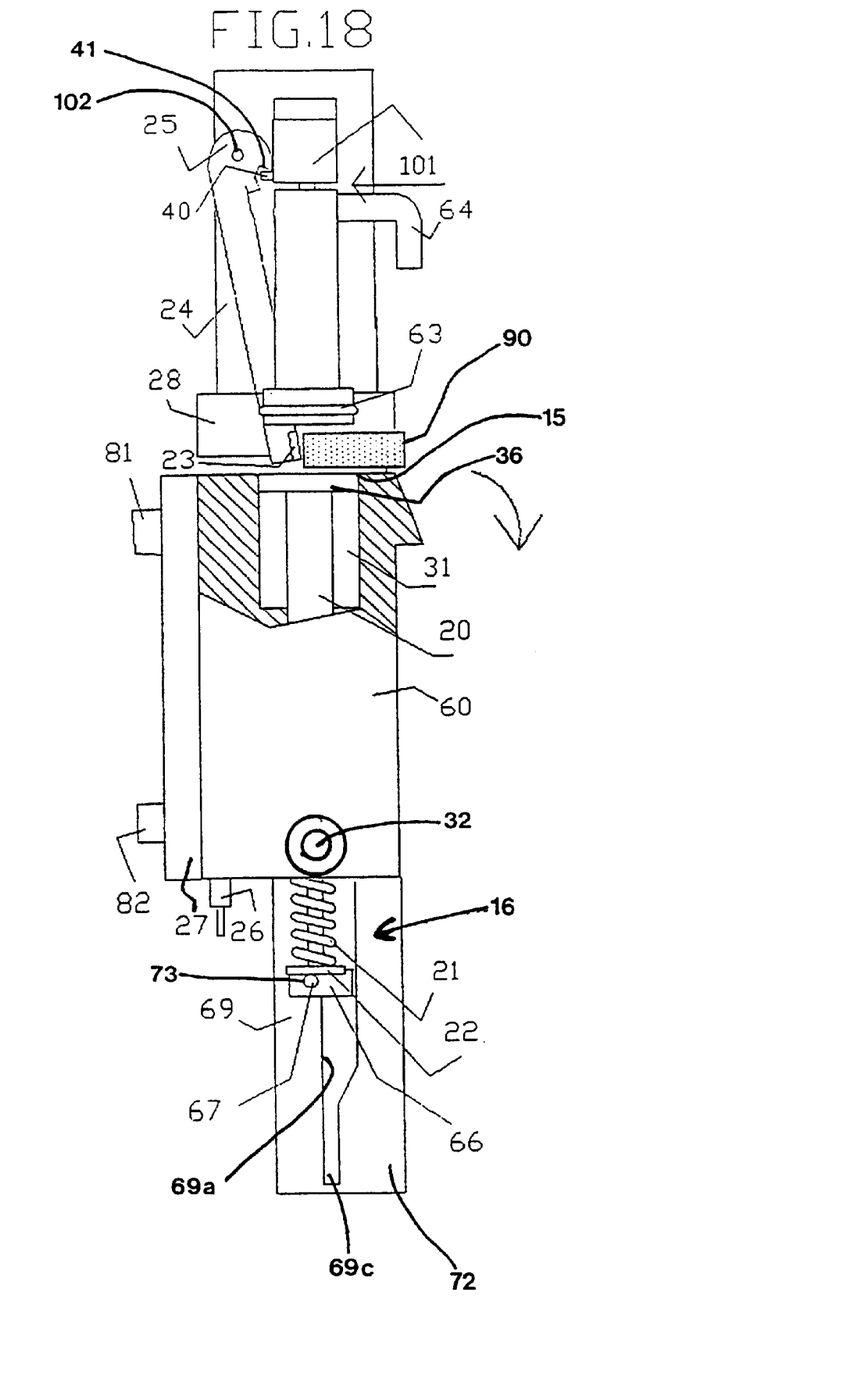

In the course of this movement of the piston 35, on the one hand, the arm 67 is positioned thanks to the path 69a of the cam 69 below the small plate 22 and presses upwardly under the influence of the spring 21 a filter plate 36 to bring it to the end of expansion of the spring 34 at the level of the outlet 15 of the infusion chamber 31, and on the other hand, simultaneously with the rising movement of the piston 35 and thanks to the beam 65–101, the presser piston 62 is disengaged from the chamber 31. During the movement of said presser piston, the arm 101 pulls on this presser piston by means of the pivot 99 and permits the escape of air at the level of the third opening 42a to cause this air to enter into the conduit 42 up to the opening 42c so as to permit drying and better compacting the body of coffee grounds 90 to be ejected. Then, practically at the end of the path of the head 35 of the piston of the jack 61, the finger 40 carried by the arm 101 engages in the notch 41 of the lever 25, thereby giving rise to the abrupt pendular sweeping movement of the scraper 23 which thus abruptly ejects the cake of grounds 90 from the filter plate 36 and hence from the outlet 15 of the chamber 31. Immediately the cycle is terminated, the cam 69, by its slope 69b, has again positioned laterally the arm 67, giving rise to the fall of the filter plate 36 to the bottom of the chamber 31 under the strength of the return spring 21; the scraper 23 will be returned to its standby position when a new infusion cycle will be started.

The invention is particularly applicable to machines for the preparation of espresso type coffee.

What is claimed is:

1. Infusion assembly for the automatic dispensing of beverages made from powdered coffee, comprising:

a body (10) enclosing an infusion chamber (31) with a vertical axis (V) having a bottom (11) and an outlet (15);

a filter plate (36) movably mounted in said chamber via an ejection mechanism (16), and adapted to receive a presser piston (62) movably mounted along said vertical axis (V); and a single-acting hydraulic jack having a piston (35) which is connected to said presser piston and can pass from a rest position to a working position, under the influence of a liquid under pressure, in which working position, the presser piston is in compression in the chamber;

said piston (35) being returned to its rest position by a compressible and extensible means (34–134);

said hydraulic jack comprising a cylinder (18) closed at its ends by an upper plug (28) and a bottom (19) and through which slide respectively an upper rod (65) connected by an arm (101) to the presser piston (62) and a lower rod (38) connected to the ejection mechanism (16);

said upper and lower rods being secured to a piston head mounted slidably in the cylinder (18) and movable between the rest position in which the head can be pressed by the pressure of a liquid introduced through a conduit (71) provided in the plug (28), and the working position in which the head can be pressed toward the upper position by the compressible and extensible means arranged below the piston head.

2. The infusion assembly according to claim 1, wherein the compressible and extensible means is a coil spring (34).

3. The infusion assembly according to claim 1, wherein the compressible and extensible means is a gas spring (134).

4. The infusion assembly according to claim 1, wherein the piston head carries a sealing means.

5. The infusion assembly according to claim 1, wherein the body is arranged laterally of the cylinder (18), and the upper rod (65) of the hydraulic jack (61) carries the arm (101) forming a beam and whose free end (9) is connected to the presser piston (62); the paths of the pistons thus being arranged in substantially parallel directions.

6. The infusion assembly according to claim 1, wherein the presser piston (62) is mounted floatingly on a pivot (99) connected to the arm (101) thereby providing a slight axial play between an upper portion (62a) of the presser piston (62) and a lower portion (101a) of the arm.

7. The infusion assembly according to claim 6, wherein the presser piston (62) comprises an internal conduit (42) for passage of the infusion said conduit having three openings, a first inlet opening for infusion (42c) opening through a lower surface (43) of the piston, a second outlet opening (42b) forming a small fountain (64) for the outlet of infusion and a third opening (42a) forming an air intake and arranged in the upper portion (62a) of the piston, said presser piston (62) being moreover movably axially mounted on the pivot (99) and said third opening (42a) comprising a joint (13) adapted to close said third opening when the piston comes into contact with the lower portion (101a) of the arm (101).

8. The infusion assembly according to claim 1, wherein the ejection mechanism (16) comprises a rod (20) secured to the filter plate (36), mounted along the vertical axis (V), sliding in the body (10) and having at its external end a small plate (22), said filter plate (36) being elastically urged toward the bottom (11) of the infusion chamber (31) by a spring (21) arranged between the body (10) and the small plate (22); and an arm (67) contacted transversely to the lower rod (38) of the jack (613, movably mounted in rotation on said rod, and of which one end (70) comes into engagement with a track (69a) of a cam (69) carried by a wing (72) extending in a vertical plane below the jack (61), whilst the other end (73) is adapted either to come into engagement with the small plate (22) when the head of the piston passes from its low position to its high position, or to escape from this plate when the head passes from its high position to its low position.

9. The infusion assembly according to claim 1, further comprising a device for expelling coffee grounds comprising a guide console (24) projecting upwardly, secured to the jack (61) and carrying a lever (25) mounted pivotably about an axis (102) transverse to the vertical axis (V) and carrying at its free end (103) a scraper (23) adapted to be moved with a transverse pendular sweeping movement in the region of the outlet (15) via a finger (40) secured to the arm (101) which comes into an engagement with a notch (41) carried by the lever (25) at the level of the axis (102), when the piston head occupies its rest position.

* * * * *